US005813123A

United States Patent [19]

Wieland et al.

[11] Patent Number: 5,813,123

[45] Date of Patent: Sep. 29, 1998

[54] MOTOR CHAINSAW WITH A CHAIN BRAKING DEVICE

[75] Inventors: Dieter Wieland; Herbert Armbruster, both of Remseck; Gerhard Meyer, Ludwigsburg, all of Germany

[73] Assignee: Andreas Stihl AG & Co., Waiblingen, Germany

[21] Appl. No.: 644,522

[22] Filed: May 10, 1996

[30] Foreign Application Priority Data

May 11, 1995 [DE] Germany .......................... 195 17 293.0

[51] Int. Cl.[6] .............................. B27B 17/00; F16D 49/04

[52] U.S. Cl. ............................ 30/382; 30/381; 188/77 W

[58] Field of Search ............................. 30/381, 382, 383; 188/77 W, 77 R, 166

[56] References Cited

U.S. PATENT DOCUMENTS

| | | | |
|---|---|---|---|
| 4,493,400 | 1/1985 | Nagashima et al. | 188/77 W |
| 4,594,780 | 6/1986 | Schliemann et al. | 30/382 |
| 4,683,660 | 8/1987 | Schurr | 30/382 |
| 5,480,009 | 1/1996 | Wieland et al. | 188/77 W |

*Primary Examiner*—Hwei-Siu Payer
*Attorney, Agent, or Firm*—Robert W. Becker & Associates

[57] ABSTRACT

A motor chainsaw has a housing enclosing a motor with actuator and a saw chain. A braking device for the saw chain is positioned in the housing. The braking device has a brake drum and a brake band guided around the brake drum. The braking device has a brake lever connected to the housing so as to be pivotable about a first axis of rotation for moving the brake band from a release position into a braking position. A return kick brake for actuating the braking device is provided. The return kick brake has a ready position and an actuated position in which the brake band is in the braking position. The return kick brake has a hand protection grip, a control lever, and a return kick brake spring for loading the control lever. The control lever, when the return kick brake is moved from the ready position into the actuated position, pivots the brake lever into the braking position. A coasting brake for actuating the braking device has a transmission member, connected to the actuator and the brake lever, and a coasting brake spring for loading the brake band in the braking position. The brake lever has a second axis of rotation extending parallel to the first axis of rotation. The brake lever pivots about the second axis of rotation when the coasting brake is actuated.

18 Claims, 6 Drawing Sheets

MOTOR CHAINSAW WITH A CHAIN BRAKING DEVICE

BACKGROUND OF THE INVENTION

The present invention relates to a motor chainsaw with a chain braking device comprised of a brake drum and a brake band wound about the brake drum which can be transferred from a release position into a braking position by a brake lever engaging the brake band. The device further comprises two actuating devices for actuating the chain brake device. These devices are in the form of a return kick brake and a coasting brake, whereby the return kick brake comprises a protective hand bracket and a control lever loaded by a return kick brake spring which upon transferring the return kick brake from a ready position into an actuated position, in which the brake band is in the braking position, the brake lever is pivoted about an axis of rotation at the housing. The coasting brake is comprised of a transmission member, positioned between the actuator for operating the motor chainsaw and the brake lever, and a coasting brake spring loading the brake band into its braking position.

Such a motor chainsaw is known from U.S. Pat. No. 4,683,660. The chain braking device of this motor chainsaw can be actuated by two actuating devices which are in the form of a return kick brake and in the form of a coasting brake. The return kick brake serves to turn off the chainsaw within a very short period of time in a dangerous situation. For this purpose, the force of a large return kick brake spring is transmitted via the control lever onto the brake lever acting on the brake band which performs a pivoting movement and moves the brake band into its braking position.

The coasting brake comprises a smaller coasting brake spring which engages the brake lever and moves the brake band into the braking position. The coasting brake comprises a transmission member that is arranged between an operating element of the motor chainsaw, for example, a throttle lever arrangement, and the brake lever. The coasting brake is always activated when the throttle lever arrangement is in a non-operative position.

When the return kick brake is activated, the transmission member, due to the pivoting movement of the brake lever, performs a return kick. Within the transmission path between the throttle lever arrangement and the brake lever, a compensation spring is arranged which is designed to reduce the return kick transmitted by the transmission member onto the throttle lever arrangement upon actuation of the return kick brake. This spring must be of a greater size than the coasting brake spring in order to ensure that upon actuation of the throttle lever arrangement the coasting brake can be released counter to the force of the coasting brake spring. Due to the relatively large spring, the reaction force onto the throttle lever arrangement upon actuation of the return kick brake is dampened only partially so that an impulse-like reaction force acts onto the throttle lever arrangement and the hand of the operator. Furthermore, it is disadvantageous that the compensation spring within the transmission path between the throttle lever arrangement and the brake lever is directed counter to the spring force of the return kick brake spring so that the brake force of the return kick brake cannot completely act on the brake band. In order to compensate for the loss in braking action, the return kick brake spring must therefore be very large.

It is therefore an object of the present invention to provide a motor chainsaw with chain braking device of the aforementioned kind such that upon release of the return kick brake the throttle lever arrangement is substantially free of reaction forces whereby the chain braking device should be of a simple design.

SUMMARY OF THE INVENTION

The motor chainsaw of the present invention is primarily characterized by:

A housing with motor and saw chain;

An actuator for the motor connected to the housing;

A braking device for the saw chain positioned in the housing;

The braking device comprising a brake drum and a brake band guided around the brake drum;

The braking device further comprising a brake lever connected to the housing so as to be pivotable about a first axis of rotation and acting on the brake band for moving the brake band from a release position into a braking position at the brake drum;

A return kick brake for actuating the braking device;

The return kick brake having a ready position and an actuated position in which the brake band is moved into the braking position at the brake drum;

The return kick brake comprised of a hand protection grip, a control lever, and a return kick brake spring for loading the control lever;

The control lever, when the return kick brake is moved from the ready position into the actuated position, pivoting the brake lever into the braking position;

A coasting brake for actuating the braking device;

The coasting brake comprising a transmission member connected to the actuator and the brake lever;

The coasting brake further comprising a coasting brake spring for loading the brake band in the braking position;

The brake lever having a second axis of rotation extending parallel to the first axis of rotation;

The brake lever pivoted about the second axis of rotation when the coasting brake is actuated.

Preferably, the motor chain saw further comprises a bearing with which the brake lever is pivotably supported at the control lever, wherein the bearing defines the second axis of rotation.

Advantageously, the coasting brake spring is connected to the brake lever and the control lever for biasing the brake lever in a direction of rotation about the second axis of rotation.

Preferably, the control lever is pivotable about the first axis of rotation.

Expediently, the control lever comprises an abutment for limiting pivoting of the brake lever about the second axis of rotation.

Preferably, the control lever has a bearing pin and the bearing pin is the abutment.

In yet another embodiment of the present invention, the transmission member has a first end engaging the brake lever and the first end is positioned adjacent to the first axis of rotation.

Preferably, the motor chainsaw further comprises a rocker arm pivotably connected to the actuator, the rocker arm comprising a recess, wherein the transmission member comprises a second end received in the recess so as to be movably guided within the recess in a pulling direction of the transmission member.

Advantageously, the rocker arm has a third axis of rotation and the actuator has a fourth axis of rotation. The third and fourth axes of rotation extend parallel to one another.

In a further embodiment of the present invention the rocker arm is a two-legged lever having a first leg and a second leg. The recess is an open longitudinal slot located at the first leg. The housing in this embodiment has an abutment and the second leg is supported at the abutment of the housing.

Preferably, in an operating position of the actuator, the first and second ends of the transmission member and the fourth axis of rotation of the actuator are positioned substantially on a straight line.

Preferably, the actuator is an on-switch lever of the motor chainsaw.

The actuator may be a throttle lever of the motor chainsaw.

In another embodiment of the present invention the actuator is a switch lock of an on-switch lever of the motor chainsaw. In the alternative, the actuator is a switch lock of a throttle lever of the motor chainsaw.

The brake lever upon actuation of the actuating devices in the form of the return kick brake and the coasting brake is pivoted about different axes of rotation so that the adjusting movement of the brake lever upon actuation of the return kick brake and of the coasting brake are decoupled (independent) from one another. The coasting and the return kick brake operate substantially independent of one another so that no reaction forces of one actuating device acts on the other actuating device. Especially the transmission member between the actuator for switching the motor chainsaw and the brake lever is substantially free of reaction forces of the return kick brake so that return kicks onto the actuator and furthermore onto the hand of the operator are substantially avoided. Since the movement for release of the return kick brake and for release of the coasting brake are decoupled from one another, a compensation spring for relieving the actuator of reaction forces of the return kick is obsolete so that the arrangement is of a much simpler design.

In an advantageous embodiment, the second axis of rotation, about which the brake lever upon release and actuation of the coasting brake is pivotable, is in the form of the axis of a bearing with which the brake lever is supported on the control lever. Upon suppressing the actuator, the coasting brake is released and the brake lever is pivoted about the second axis of rotation at the control lever. Upon actuation of the return kick brake in a dangerous situation, the brake lever is pivoted about the first axis of rotation at the housing.

Expediently, the first axis of rotation of the brake lever at the housing is identical to the axis of rotation of the control lever whereby the pivoting movement of the brake lever about the second axis of rotation is limited by an abutment at the control lever. This abutment is preferably in the form of a bearing pin of the control lever extending coaxially with the first axis of rotation. By suppressing the actuator, the brake lever is pivoted about second axis of rotation provided at the control lever until it reaches the abutment in the form of the bearing pin.

The end of the transmission member which engages the brake lever can be positioned, in the operating position of the actuator, adjacent to the first axis of rotation of the brake lever and the control lever at the housing so that the transmission member remains substantially unaffected by the pivoting movement caused by the return kick brake.

BRIEF DESCRIPTION OF THE DRAWINGS

The object and advantages of the present invention will appear more clearly from the following specification in conjunction with the accompanying drawings, in which.

DESCRIPTION OF THE PREFERRED EMBODIMENTS

The present invention will now be described in detail with the aid of several specific embodiments utilizing FIGS. 1 through 6.

Figure 1:
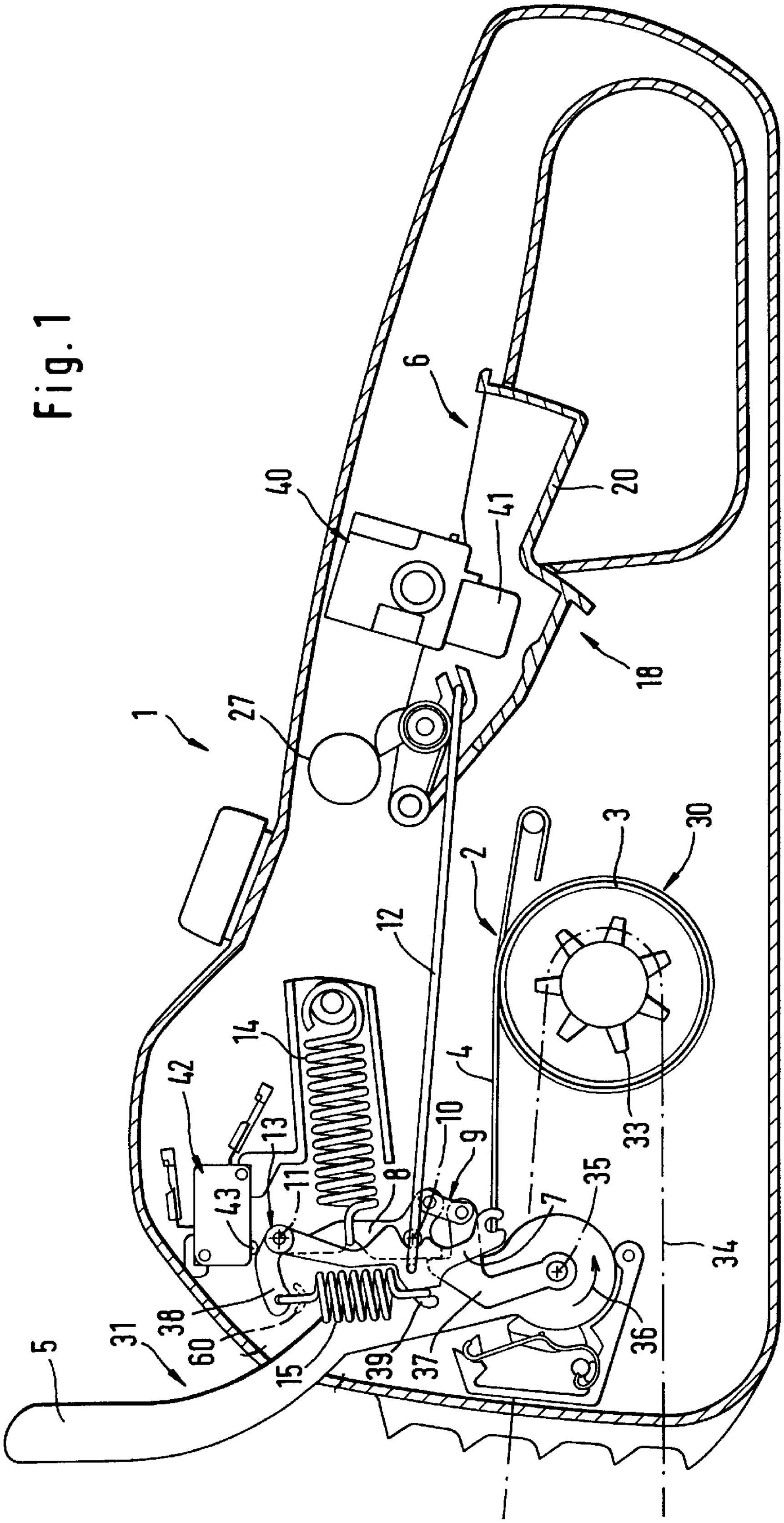
FIG. 1 shows a motor chainsaw in the non-operative position with a chain braking device which can be actuated by a return kick brake and a coasting brake.

FIG. 1 shows in section a motor chainsaw with housing 1 which comprises a saw chain 34 driven by a chain wheel 33. Coaxially to the chain wheel 33 a coupling and brake drum 3 is arranged which is fixedly connected to the chain wheel 33. The coupling and brake drum 3 is driven by the shaft of a drive motor whereby the drive motor may be a combustion engine or an electric motor. The brake drum 3 is substantially cup-shaped and forms together with a brake band 4 wound about the brake drum 3 a chain braking device 2. Upon applying a braking force onto the brake band 4, the brake band 4 rests frictionally and non-positively on the cylindrical mantle surface of the brake drum 3 which is thus braked and, in turn, stops the chain wheel 33. The chain wheel 33 is fixedly connected to the brake drum 3 and thus also stops the saw chain 34.

The chain braking device 2 can be actuated by two different actuating devices which are in the form of a return kick brake and by a coasting brake.

The return kick brake is comprised of a hand protection bracket 5 and a control lever 8 at which a return kick brake spring 14 engages. The return kick brake can be moved from the ready position 31 represented in FIG. 1 into the actuated position 32 represented in FIG. 2. The movement is actuated by pivoting the hand protection bracket 5 about the axis of rotation of the bearing 35 at the housing in the direction of arrow 36 which causes a lever 37 arranged at the hand protection bracket 5 to follow. The lever 37 acts onto an elbow joint arrangement 9 and pivots it from its locked position via its stretched position into a release position. The elbow joint arrangement 9 is connected to the control lever 8 and supports in its locked position the control lever 8. In the locked position, the force of the return kick brake spring 14 acting on the control lever 8 is transmitted via the elbow joint arrangement 9 and the lever 37, arranged at the hand protection bracket 5, onto the bearing 35 connected to the housing of the hand protection bracket 5. In the actuated position 32 the control lever 8 is released from the elbow joint arrangement 9, i.e., is no longer supported. It is thus pivoted by the return kick brake spring 14 about the axis of rotation 10 at the housing. A brake lever 7 connected to the brake band 4 is pivotably supported with bearing 13 at the control lever 8. The bearing axis (second axis of rotation) 11 of the bearing 13 is preferably parallel to the first axis of rotation 10 at the housing. Via the bearing 13 the brake force exerted by the return kick brake spring 14 in the actuated position 32 of the return kick brake is transmitted from the control lever 8 onto the brake lever 7. Due to the actuation of the return kick brake, the brake lever 7 performs the same rotational movement about the axis of rotation 10 at the housing as the control lever 8. The brake band 4 is thus moved from its release position into a braking position 30. In the braking position 30, the brake band 4 rests under the high spring force of the return kick brake spring 14 at the brake drum 3 so that the brake drum 3 and thus the saw chain are braked within a fraction of a second.

The chain braking device 2 can also be actuated by the second actuating device in the form of the coasting brake. For this purpose, a transmission member 12 is arranged between the actuator of the motor chainsaw, for example, in the form of a throttle lever arrangement 6, preferably a throttle lever 20, and the brake lever 7. The transmission member 12 engages via coasting brake spring 15 the brake lever 7. In the off position 18 of the throttle lever arrangement 6 (FIG. 1) the coasting brake is activated, in the operating position 19 of the throttle lever arrangement 6 (FIG. 2) the coasting brake is released. In the non-operative position 18 the coasting brake spring 15 loads the brake lever 7 such that it is rotated about the bearing axis 11 of the bearing 13 such that the brake band 4 rests on the brake drum 3. Upon actuation of the throttle lever arrangement 6, for example, of the throttle lever 20 in FIG. 2, into its operating position 19, the transmission member 12 is entrained and pivots the brake lever 7 counter to the force of the coasting brake spring 15 about the bearing axis 11. The brake band 4 is moved into its release position so that the brake drum 3 is released and the chain wheel 33 which drives the saw chain 34 can rotate.

Figure 3:
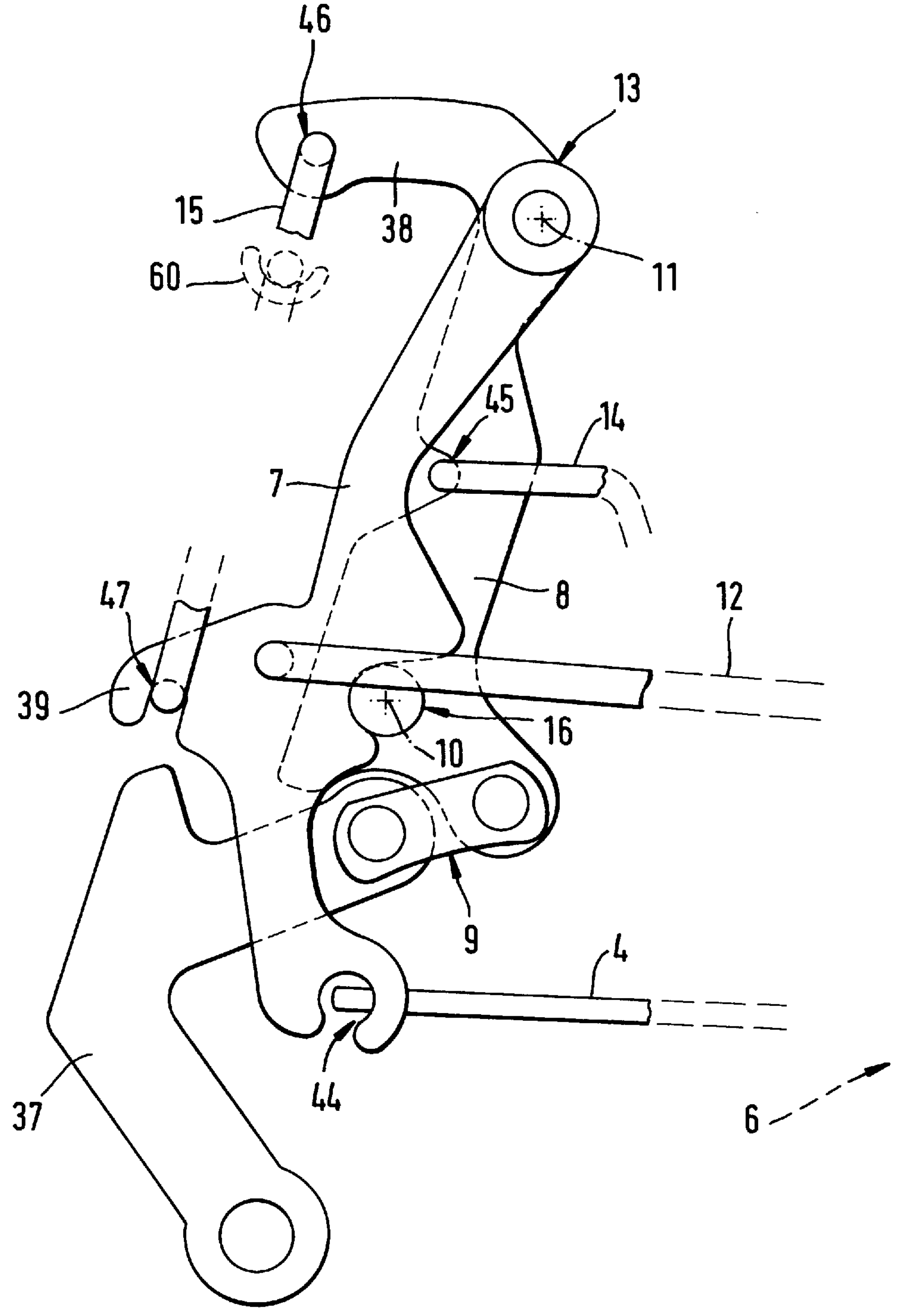
FIG. 3 is an enlarged representation of the lever mechanism for actuating the chain braking device.

Expediently, the coasting brake spring 15 is arranged between the brake lever 7 and the control lever 8 and loads the brake lever 7 about the second axis of rotation, i.e., the bearing axis 11, in the direction of the braking position 30 of the brake band 4. The control lever 8 comprises a projecting arm 38 at the level of the bearing 13. A free end of the projecting arm 38 engages the coasting brake spring 15. The projecting arm 38 is positioned approximately perpendicular to the control lever 8 and has a length which corresponds substantially to half the distance between the first and the second axes of rotation 10, 11 (FIG. 3). It may be expedient to support the coasting brake spring 15 not at the control lever 8 but at the housing. The end of the coasting brake spring 15 remote from the projecting arm 38 is connected to the brake lever 7. The end of the spring 15 engages a hook 39 of the brake lever 7. The hook 39 is positioned on a side of the brake lever 7 which faces away from the first axis of rotation 10 approximately at an extension of the transmission lever 12 between the actuator (throttle lever arrangement) 6 and the brake lever 7. The return kick brake spring 14 as well as the coasting brake spring 15 are in the form of tension springs, preferably coil springs. The coasting brake spring 15 effects, corresponding to its spring force and the selected lever arrangement, a torque onto the brake lever 7 about the bearing axis 11, which is transmitted via the connecting point 44 of the brake lever 7 onto the brake band 4. The points of force induction 46 and 47 of the coasting brake spring 15 at the projecting arm 38 and at the hook 39 determine a line which is approximately parallel to a plane extending through the two axis of rotation 10 and 11. The axis of rotation 10, the bearing axis 11, and the points of application of force 46 and 47 form the corner points of a rectangle.

The leverage ratios according to FIG. 3 are selected advantageously such that the lever arm of the brake lever 7 between the first axis of rotation 10 and the point of connection 44 of the brake band 4 at the brake lever 7 is only half the length of the distance between the axis of rotation 10 and the bearing axis 11. This leverage ratio enhances the spring force of the return kick brake spring 14 acting on the brake band 4. The point of application of force 45 of the return kick brake spring 14 at the control lever 8 is positioned approximately in the area of half the distance between the two axes of rotation 10 and 11.

Figure 2:
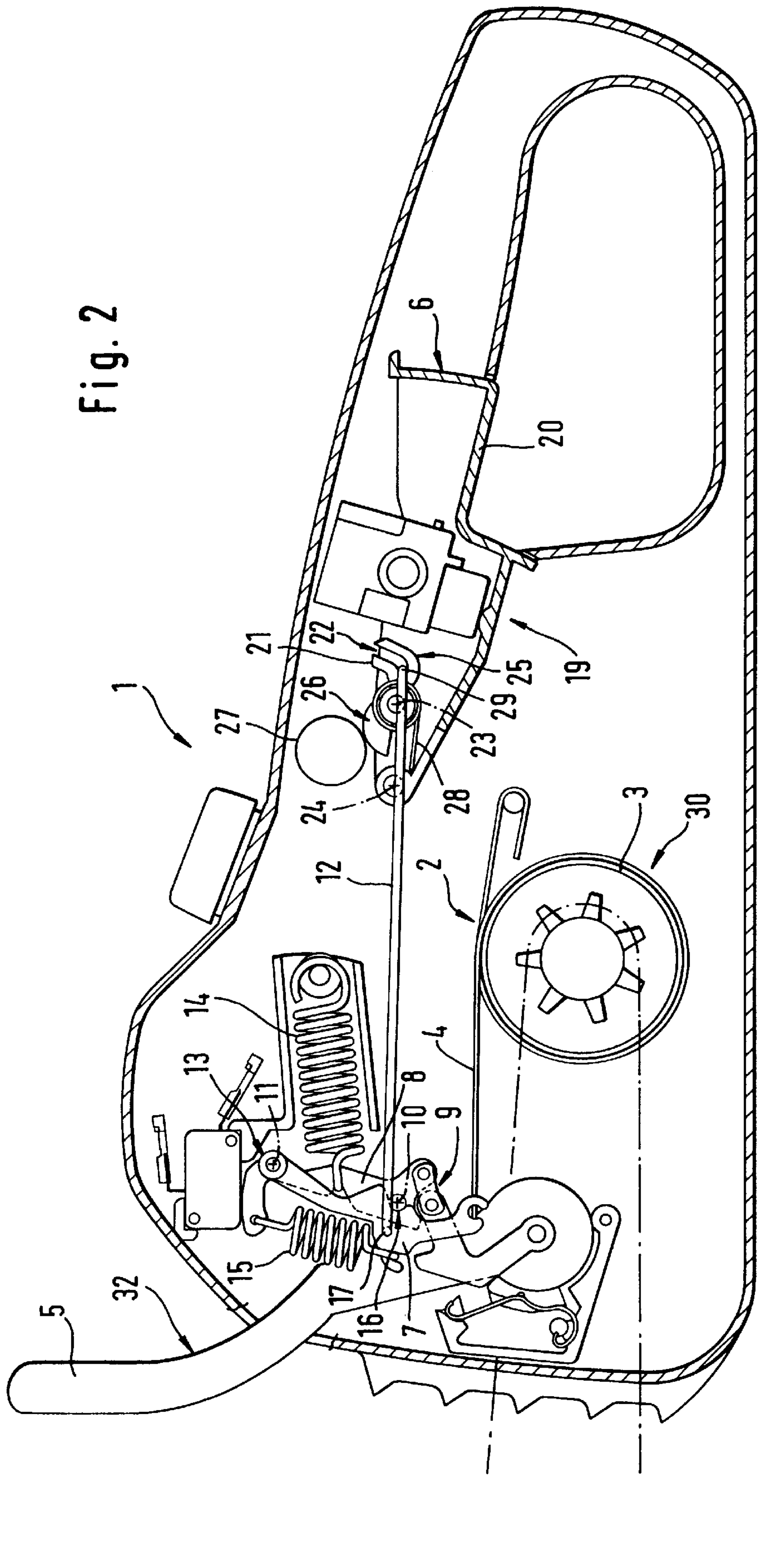
FIG. 2 is a representation according to FIG. 1 whereby the motor chainsaw is in its operating position and the return kick brake is in its actuated position.

Upon actuation of the throttle lever 20 the transmission member 12 pulls at the brake lever 7 and effects a rotation of the brake lever 7 about the second axis of rotation respectively, about the bearing axis 11 so that the coasting brake is released. Expediently, the resulting pivoting movement of the brake lever 7 about the bearing axis 11 is limited by the abutment at the control lever 8. The abutment is advantageously a bearing pin 16 which projects past the surface of the control lever 8. The bearing pin 16 forms the common axis of rotation 10 of the control lever 8 and the brake lever 7 (FIG. 2). The brake lever 7 has a part-circular recess at the side facing the bearing pin 16 in which the bearing pin 16 in the operating position 19 of the throttle lever arrangement 6 is received. The control lever 8 and the brake lever 7 are positioned in planes that are parallel to one another so that a decoupled movement of the two levers 7 and 8 is possible.

The end 17 of the transmission member 12 engaging the brake lever 7 is expediently positioned adjacent to the first axis of rotation 10 at the housing. In the operating position 19 (FIG. 2) of the throttle lever arrangement 6, in which the coasting brake is released and in which the brake lever 7 rests at the bearing pin 16, this positioning is advantageous because a pivoting movement of the brake lever 7, for example, upon actuating of the return kick brake, has substantially no influence on the position of the transmission member 12. The activation of the return kick brake thus has no effect on the throttle lever arrangement 6.

The end 17 of the transmission member 12 is advantageously in the form of a pin which engages a recess at the brake lever 7. The other end 29 of the transmission member 12, which is advantageously in the form of a rod, engages a recess 22 of a rotatably supported rocker arm 21 whereby the end 29 is longitudinally displaceably guided within the recess 22. The end 29 for this purpose is advantageously pin-shaped and is positioned in a slot-shaped recess 22. The rocker arm 21 has an axis of rotation 23 extending parallel to the pivot axis 24 of the throttle lever 20 whereby the axis of rotation 23 together with the rocker arm 21 and the throttle lever 20 are rotatable about the pivot axis 24. In the operating position 19 of the throttle lever 20 (FIG. 2) the ends 17 and 29 of the transmission member 12 and the axis of rotation 23 of the rocker arm, as well as the pivot axis 24 of the throttle lever 20 are positioned approximately on a straight line. The axis of rotation 23 of the rocker arm 21 is positioned closer to the end 29 facing the throttle lever 20 than the pivot axis 24 of the throttle lever 20. In the operating position 19 the transmission member 12 transmits a pulling force whereby this pulling force secures the brake band 4 counter to the force of the coasting brake spring 15 in the release position. Due to the selected arrangement of the axes of rotation and the ends of the transmission member approximately along a straight line, the throttle lever 20 in the operating position is substantially free of securing forces to be applied by an operator. The applied pulling force is substantially received by the bearing of the throttle lever 20.

The rocker arm 21 is of a two-legged design whereby the first leg 25 comprises the recess 22 and the second leg 26 is supported at an abutment 27 connected to the housing. The second leg 26 has a curved support surface facing the abutment 27 whereby the free end section of the support surface is advantageously resting at the cylindrical abutment 27 in the non-operative position 18 (FIG. 2) as well as in the operating position 19 (FIG. 1) of the throttle lever 20. The slot of the recess 22 is open at one side so that the pin-shaped end 29 of the transmission member 12 is movable in the longitudinal direction within the recess 22. When upon actuation of the return kick brake the transmission member performs a longitudinal movement, which may occur when the coasting brake is released, the end of the transmission member 12 can move so that no reaction forces will act on the throttle lever arrangement 6.

The throttle lever 20 is advantageously loaded by a rotational spring 28 into its non-operating position 18. The rotational spring 28 is positioned coaxially to the axis of rotation 23 of the rocker arm 21 whereby a spring end of the rotational spring 28 loads the throttle lever arrangement 6 and the second spring end of the rotational spring 28 secures the rocker arm 21 with its abutment surface at the abutment 27 of the housing.

The drive motor in the shown embodiment is an electric motor which drives the brake drum 3 in the form of a hollow wheel. The electric motor is to be turned on and turned off by a sensor 40 to be activated by the throttle lever 20 (FIG. 1). The throttle lever 20 acts onto a switching pin 41 of the sensor 40. The switching pin 41 is loaded into its off-position by an inner pressure spring. When the throttle lever 20 is transferred into its non-operating position, the sensor 40 and thus the electric motor is turned off before the coasting brake is activated.

In order to turn off the drive motor upon actuation of the return kick brake, a microswitch 42 is provided. Its switching pin 43 is actuated by the projecting arm 38 of the control lever 8. As soon as the return kick brake is activated, the pivot lever 8 together with the unitary projecting arm 38 is pivoted so that the switching pin 43 is suppressed and the microswitch 42, which is switched electrically in series with the sensor 40, is turned off.

Figure 4:
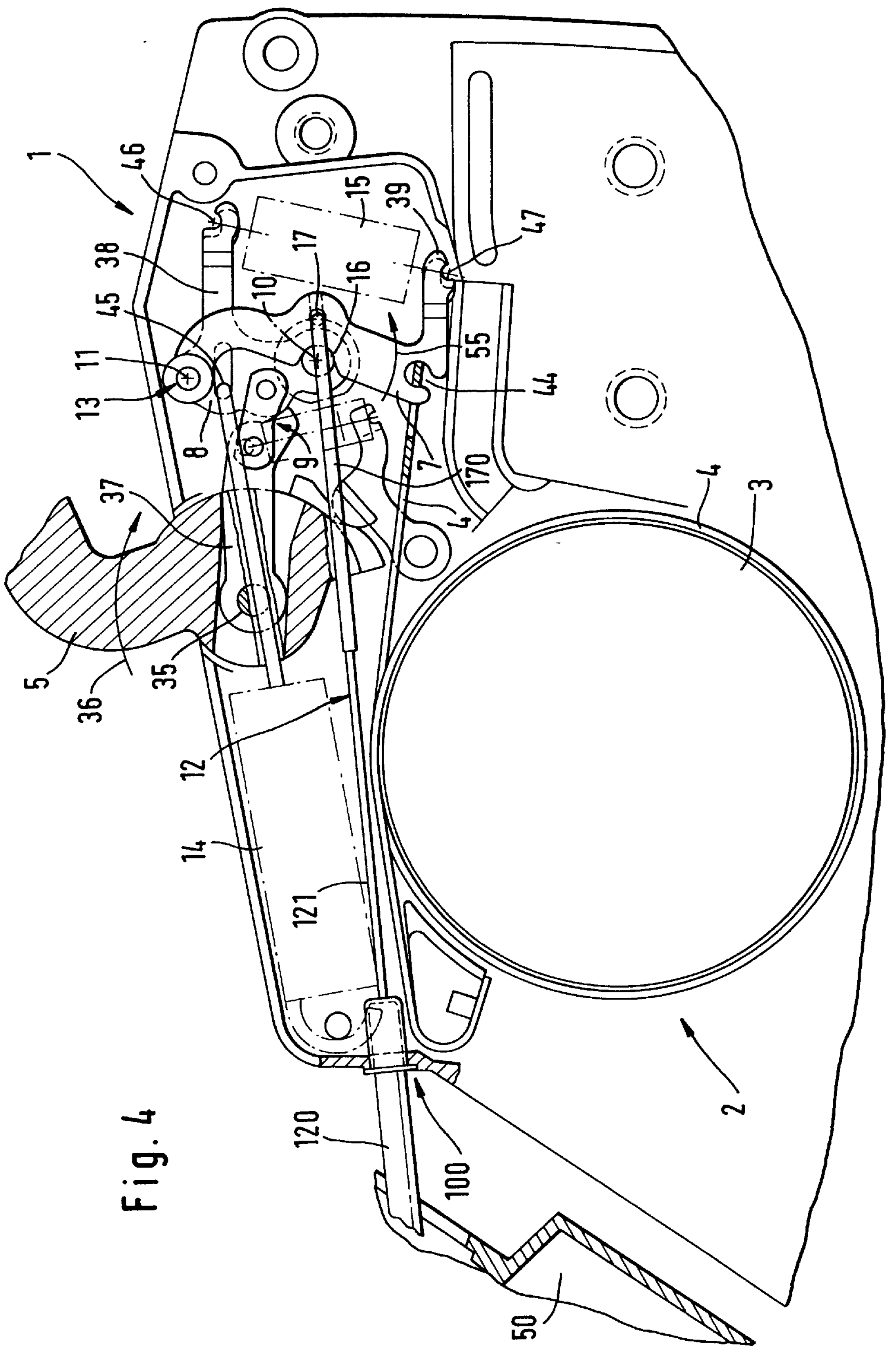
FIG. 4 is a representation of a chain braking device according to FIG. 1 with a Bowden cable as a transmission member.
Figure 5:
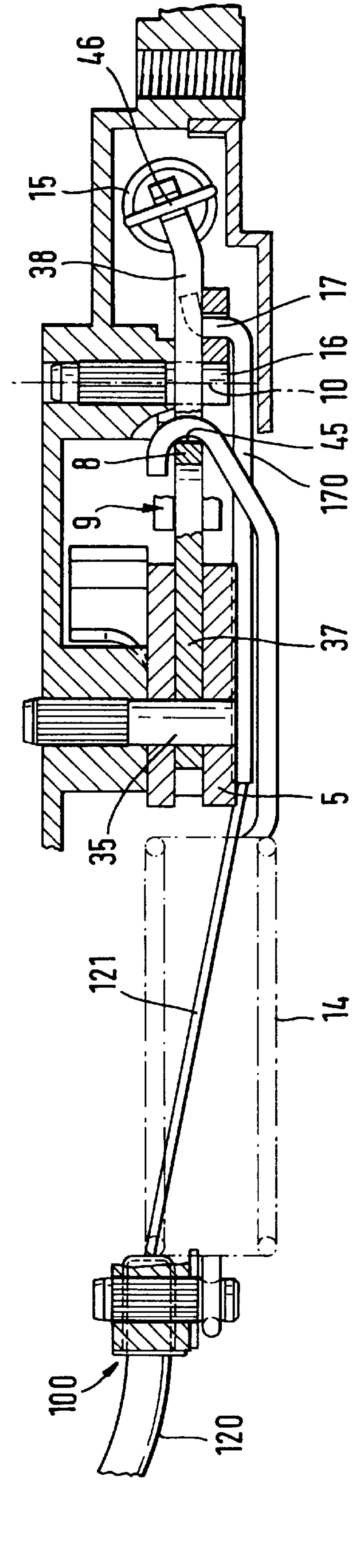
FIG. 5 is a lateral view of the lever arrangement for releasing the chain braking device.
Figure 6:
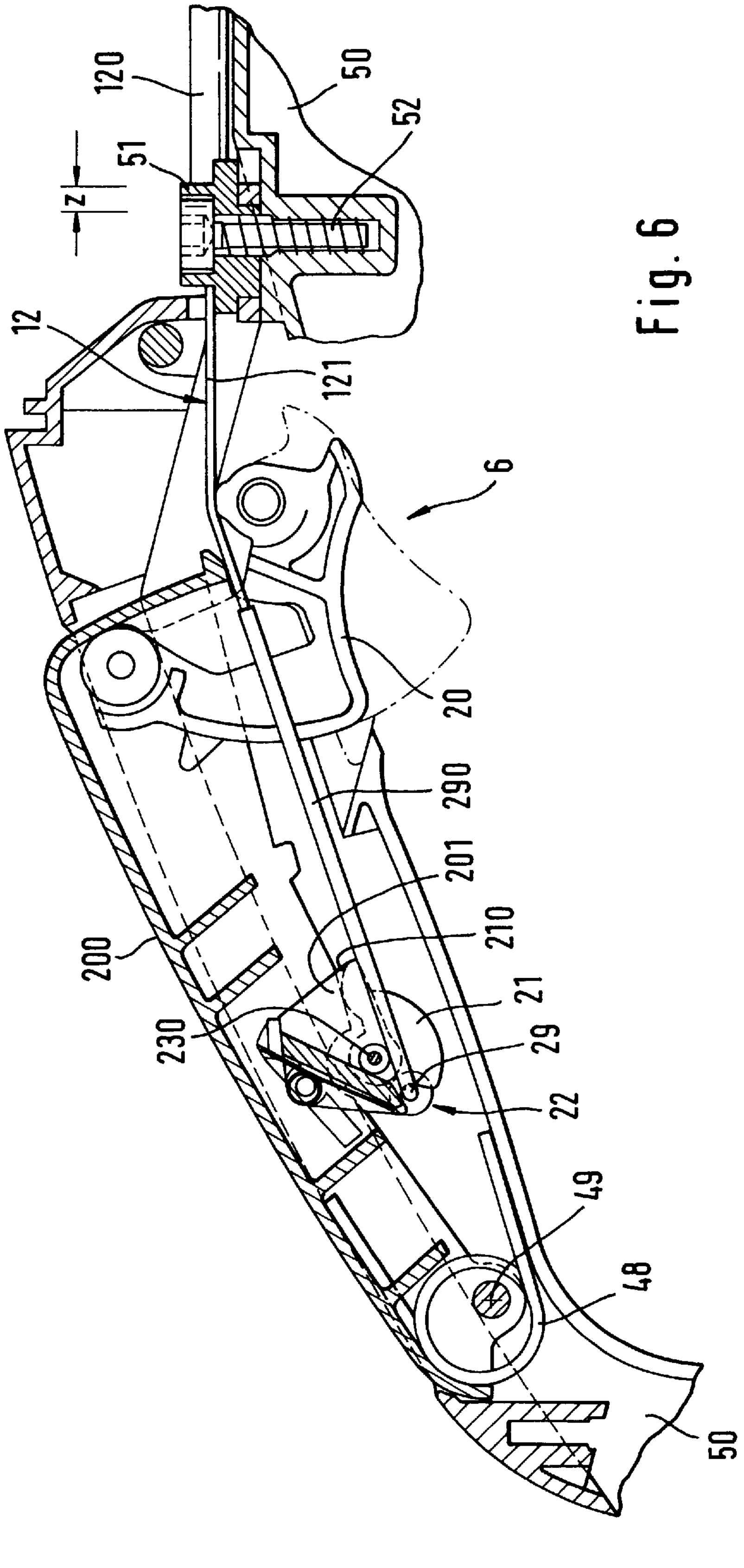
FIG. 6 is a view of a throttle lever arrangement with a Bowden cable as a transmission member connected to the throttle lever lock.

In the embodiment represented in FIGS. 4 to 6 the drive motor is a combustion engine which is preferably in the form of a two-stroke engine. The brake drum 3 simultaneously forms the coupling drum of a non-represented centrifugal clutch which is driven by the combustion engine.

The design and function of the chain braking device comprising the return kick brake and the coasting brake corresponds to the embodiment according to FIGS. 1 to 3 so that identical parts are identified with the same reference numerals.

Especially in the side view according to FIG. 5 the levers 7, 8 and 37 are easily visible. They are arranged in parallel planes are pivotable about pins 16 and 35 connected to the housing.

The transmission member for releasing the coasting brake by pivoting the brake lever 7 against the force of the coasting brake spring 15 is in the form of a Bowden cable which is comprised of a sleeve 120 and a flexible cable 121. The forward end of the flexible cable 121 facing the brake lever 7 is in the form of a stiff rod 170 the free end 17 of which is bent and pin shaped and engages the corresponding opening of the brake lever 7. From FIGS. 4 and 5 it can be seen that the flexible cable with its end facing the chain braking device is supported at the housing in a housing opening 100. The sleeve 120 at the opposite end is secured in the area of the rearward grip 50 of the motor chainsaw at a securing piece 51 which is secured with a screw 52 at the grip 50. The securing piece 51 is slidable along the grip by a compensation travel z with an eccentric bearing so that the Bowden cable can be easily adjusted.

The flexible cable 121 projecting at the grip side from the Bowden sleeve 120 ends in a rod-shaped end piece 290 the free end 29 of which is bent to form a pin and engages a recess 22 of the rocker arm 21 which is pivotable about an axis of rotation 230 of the housing. For this purpose, the rocker arm 21 (as shown in FIG. 2), according to the embodiment of FIGS. 1 to 3, comprises a curved support surface 210 which is positioned opposite the actuating cam 201 of the actuator 200. The actuator 200 in the shown embodiment according to FIG. 6 is a throttle lever lock which cooperates with a throttle lever 20. The throttle lever lock 200 is arranged on the grip opposite the throttle lever 20 and is pivotable about an axis of rotation 49 at the housing. In this area a leg spring 48 is arranged which biases the throttle lever lock 200 into its non-operative position. The embodiment according to FIGS. 4 to 6 corresponds in its function with respect to the coasting brake to the previously disclosed embodiment. By suppressing the throttle lever lock 200, the rocker arm 21 is pivoted about the axis of rotation 230 at the housing and entrains the end piece 290 of the flexible cable 121 so that the cable is displaced and the brake lever 7 is moved counter to the force of the coasting brake spring 15 into the release position of the brake band 4.

When the throttle lever lock 200 is released, it is returned by the rotational spring 48 as well as the force of the coasting brake spring 15 into its initial position. The rocker arm 21 pivots back into its rest position and releases the flexible cable 121. The coasting brake spring 15 pivots the brake lever in direction of arrow 55 about the bearing axis 11 so that the brake band 4 contacts the brake drum 3 and brakes the brake drum 3.

It may be expedient to suspend the coasting brake spring 15 not at the projecting arm 38 but directly at the housing of the motor chainsaw as is shown in dashed lines in FIGS. 1 and 3. For this purpose a suspending pin 60 is provided at the housing.

The present invention is, of course, in no way restricted to the specific disclosure of the specification and drawings, but also encompasses any modifications within the scope of the appended claims.

What we claim is:

1. A motor chainsaw comprising:

a housing with a motor and a saw chain;

an actuator for said motor connected to said housing;

a braking device for said saw chain positioned in said housing;

said braking device comprising a brake drum and a brake band guided around said brake drum;

said braking device further comprising a brake lever connected to said housing so as to be pivotable about a first axis of rotation and acting on said brake band for moving said brake band from a release position into a braking position at said brake drum;

a return kick brake for actuating said braking device;

said return kick brake having a ready position and an actuated position in which said brake band is moved into said braking position at said brake drum;

said return kick brake comprised of a hand protection grip, a control lever, and a return kick brake spring for loading said control lever;

said control lever, when said return kick brake is moved from said ready position into said actuated position, pivoting said brake lever about said first axis of rotation into said braking position;

a coasting brake for actuating said braking device;

said coasting brake comprising a transmission member connected to said actuator and said brake lever;

said coasting brake further comprising a coasting brake spring for loading said brake band in said braking position;

said brake lever having a second axis of rotation extending parallel to said first axis of rotation;

said brake lever pivoted about said second axis of rotation when said coasting brake is actuated;

wherein said transmission member has a first end engaging said brake lever and wherein said first end is positioned adjacent to said first axis of rotation;

a rocker arm pivotably connected to said actuator, said rocker arm comprising a recess, wherein said transmission member comprises a second end received in said recess so as to be moveably guided within said recess in a pulling direction of said transmission member; and said rocker arm having a third axis of rotation and said actuator having a fourth axis of rotation, wherein said third and fourth axes of rotation extend parallel to one another.

2. A motor chainsaw according to claim 1, wherein in an operating position of said actuator said first and second ends of said transmission member and said fourth axis of rotation of said actuator are positioned substantially on a straight line.

3. A motor chainsaw comprising:

a housing with a motor and a saw chain;

an actuator for said motor connected to said housing;

a braking device for said saw chain positioned in said housing;

said braking device comprising a brake drum and a brake band guided around said brake drum;

said braking device further comprising a brake lever connected to said housing so as to be pivotable about a first axis of rotation and acting on said brake band for moving said brake band from a release position into a braking position at said brake drum;

a return kick brake for actuating said braking device;

said return kick brake having a ready position and an actuated position in which said brake band is moved into said braking position at said brake drum;

said return kick brake comprised of a hand protection grip, a control lever, and a return kick brake spring for loading said control lever;

said control lever, when said return kick brake is moved from said ready position into said actuated position, pivoting said brake lever about said first axis of rotation into said braking position;

a coasting brake for actuating said braking device;

said coasting brake comprising a transmission member connected to said actuator and said brake lever;

said coasting brake further comprising a coasting brake spring for loading said brake band in said braking position;

said brake lever having a second axis of rotation extending parallel to said first axis of rotation;

said brake lever pivoted about said second axis of rotation when said coasting brake is actuated;

said transmission member having a first end engaging said brake lever and wherein said first end is positioned adjacent to said first axis of rotation;

a rocker arm pivotably connected to said actuator, said rocker arm comprising a recess, wherein said transmission member comprises a second end received in said recess so as to be moveably guided within said recess in a pulling direction of said transmission member;

wherein said rocker arm is a two-legged lever having a first leg and a second leg;

wherein said recess is an open longitudinal slot located at said first leg;

wherein said housing has an abutment and said second leg is supported at said abutment of said housing.

4. A motor chainsaw comprising:

a housing with a motor and a saw chain;

an actuator for said motor connected to said housing;

a braking device for said saw chain positioned in said housing;

said braking device comprising a brake drum and a brake band guided around said brake drum;

said braking device further comprising a brake lever connected to said housing so as to be pivotable about a first axis of rotation and acting on said brake band for moving said brake band from a release position into a braking position at said brake drum;

a return kick brake for actuating said braking device;

said return kick brake having a ready position and an actuated position in which said brake band is moved into said braking position at said brake drum;

said return kick brake comprised of a hand protection grip, a control lever, and a return kick brake spring for loading said control lever;

said control lever, when said return kick brake is moved from said ready position into said actuated position, pivoting said brake lever about said first axis of rotation into said braking position;

a coasting brake for actuating said braking device;

said coasting brake comprising a transmission member connected to said actuator and said brake lever;

said coasting brake further comprising a coasting brake spring for loading said brake band in said braking position;

said brake lever having a second axis of rotation extending parallel to said first axis of rotation at a distance to said first axis of rotation;

said brake lever pivoted about said second axis of rotation when said coasting brake is actuated.

5. A motor chainsaw according to claim 1, further comprising a bearing with which said brake lever is pivotably supported at said control lever, wherein said bearing defines said second axis of rotation.

6. A motor chainsaw according to claim 1, wherein said coasting brake spring is connected to said brake lever and said control lever for biasing said brake lever in a direction of rotation about said second axis of rotation.

7. A motor chainsaw according to claim 1, wherein said control lever is pivotable about said first axis of rotation.

8. A motor chainsaw according to claim 1, wherein said control lever comprises an abutment for limiting pivoting of said brake lever about said second axis of rotation.

9. A motor chainsaw according to claim 8, wherein said control lever has a bearing pin and wherein said bearing pin is said abutment.

10. A motor chainsaw according to claim 1, wherein said transmission member has a first end engaging said brake lever and wherein said first end is positioned adjacent to said first axis of rotation.

11. A motor chainsaw according to claim 10, further comprising a rocker arm pivotably connected to said actuator, said rocker arm comprising a recess, wherein said transmission member comprises a second end received in said recess so as to be moveably guided within said recess in a pulling direction of said transmission member.

12. A motor chainsaw according to claim 11, wherein:

said rocker arm has a third axis of rotation;

said actuator has a fourth axis of rotation; and said third and fourth axes of rotation extending parallel to one another.

13. A motor chainsaw according to claim 12, wherein in an operating position of said actuator said first and second ends of said transmission member and said fourth axis of rotation of said actuator are positioned substantially on a straight line.

14. A motor chainsaw according to claim 11, wherein:

said rocker arm is a two-legged lever having a first leg and a second leg;

said recess is an open longitudinal slot located at said first leg;

said housing has an abutment; and said second leg is supported at said abutment of said housing.

15. A motor chainsaw according to claim 1, wherein said actuator is an on-switch lever of said motor chainsaw.

16. A motor chainsaw according to claim 1, wherein said actuator is a throttle lever of said motor chainsaw.

17. A motor chainsaw according to claim 1, wherein said actuator is a switch lock of an on-switch lever of said motor chainsaw.

18. A motor chainsaw according to claim 1, wherein said actuator is a switch lock of a throttle lever of said motor chainsaw.

* * * * *